(12) United States Patent
Inoue et al.

(10) Patent No.: US 11,067,876 B2
(45) Date of Patent: Jul. 20, 2021

(54) PROJECTION DISPLAY DEVICE

(71) Applicant: FUJIFILM Corporation, Tokyo (JP)

(72) Inventors: Kazuki Inoue, Saitama (JP); Chikara Yamamoto, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/800,533

(22) Filed: Feb. 25, 2020

(65) Prior Publication Data

US 2020/0278594 A1 Sep. 3, 2020

(30) Foreign Application Priority Data

Feb. 28, 2019 (JP) .............................. JP2019-036578

(51) Int. Cl.
*G03B 21/14* (2006.01)
*G02B 13/16* (2006.01)
*G03B 21/20* (2006.01)

(52) U.S. Cl.
CPC ........... *G03B 21/142* (2013.01); *G02B 13/16* (2013.01); *G03B 21/145* (2013.01); *G03B 21/2033* (2013.01)

(58) Field of Classification Search
CPC ....... G03B 21/142; G03B 21/14; G02B 13/16
See application file for complete search history.

(56) References Cited

U.S. PATENT DOCUMENTS

2016/0021351 A1* 1/2016 Yamagishi ......... G02B 27/1006
348/745

FOREIGN PATENT DOCUMENTS

WO 2017014317 A1 1/2017

* cited by examiner

*Primary Examiner* — Ryan D Howard
(74) *Attorney, Agent, or Firm* — Studebaker & Brackett PC

(57) ABSTRACT

The projection display device includes an imaging element, a light valve, and an image-forming optical system that projects an optical image according to light emitted from the light valve onto a magnification side imaging surface and forms an image of light incident from a magnification side on an imaging element. The image-forming optical system includes a first optical system that comprises at least one lens and is used in common in projection and imaging, and a separation member that separates an optical path from the light valve toward the first optical system from an optical path from the first optical system toward the imaging element. An antireflection layer is comprised in at least one of antireflection target surfaces having a significant influence of ghost light.

9 Claims, 9 Drawing Sheets

PROJECTION DISPLAY DEVICE

CROSS REFERENCE TO RELATED APPLICATIONS

The present application claims priority under 35 U.S.C. § 119 to Japanese Patent Application No. 2019-036578 filed on Feb. 28, 2019. The above application is hereby expressly incorporated by reference, in its entirety, into the present application.

BACKGROUND OF THE INVENTION

1. Field of the Invention

The present disclosure relates to a projection display device.

2. Description of the Related Art

In recent years, a projection display device that comprises a light valve, such as a liquid crystal display element or a liquid crystal on silicon (LCOS) display element, comprises an imaging element, such as a charge coupled device (CCD) or a complementary metal oxide semiconductor (CMOS), and can perform both projection and imaging has been suggested (for example, WO2017/014317).

SUMMARY OF THE INVENTION

The projection display device of WO2017/014317 comprises a separation member that separates an optical path from a light valve toward a screen from an optical path from a magnification side (screen side) toward an imaging element, and is configured such that a part of an image-forming optical system in the projection display device is used in common at the time of projection and at the time of imaging.

However, in a case where a part of the image-forming optical system is used in common at the time of projection and at the time of imaging, there is a concern that projection light with high brightness is reflected by a lens surface of the common part and is incident on the imaging element as ghost light with high brightness.

In particular, in a case where ghost light has imageability, there is a problem in that ghost light based on an optical image emitted from the light valve forms an image on the imaging element and is reflected in a captured image as a double image, and imaging quality is degraded.

The present disclosure has been accomplished in consideration of the above-described situation, and an object of the present disclosure is to provide a projection display device capable of performing both projection and imaging, and suppressing deterioration of imaging quality.

A projection display device according to an aspect of the present disclosure comprises an imaging element that performs imaging with received light, a light valve that emits an optical image based on image data, and the image-forming optical system that projects an optical image according to light emitted from the light valve onto a magnification side imaging surface and forms an image of light incident from a magnification side on the imaging element. The image-forming optical system comprises a first optical system that comprises at least one lens and is used in common in projection and imaging, and the separation member that separates an optical path from the light valve toward the first optical system from an optical path from the first optical system toward the imaging element. In a case where a magnification of a reflection system having a path, along which light from the light valve is reflected by one surface of the lens in the first optical system and reaches the imaging element, is BETn, and a magnification of an entire system having a path, along which light from the light valve is reflected by the magnification side imaging surface and reaches the imaging element, is BET, surfaces satisfying Conditional expression (1) among the surfaces of the lens in the first optical system are set as antireflection target surfaces, and at least one of the antireflection target surfaces comprises an antireflection layer.

$$0 \leq BETn/BET \quad (1)$$

In the projection display device of the above-described aspect, it is preferable that Conditional expression (1-1) is satisfied.

$$0 \leq BETn/BET < 8 \quad (1\text{-}1)$$

In the projection display device of the above-described aspect, it is preferable that the antireflection layer is a layer that has reflectance equal to or less than 0.18% in a wavelength range of 380 to 780 nm.

In the projection display device of the above-described aspect, it is preferable that, in a case where a paraxial imaging position of the reflection system is In, a paraxial imaging position of the entire system is I, and a focal length of the entire system is f, the antireflection target surfaces satisfy Conditional expression (2). It is more preferable that Conditional expression (2-1) is satisfied.

$$|(In-I) \times BETn/f| \times 100 < 50 \quad (2)$$

$$0 \leq |(In-I) \times BETn/f| \times 100 < 2 \quad (2\text{-}1)$$

In the projection display device of the above-described aspect, it is preferable that the first optical system has at least two negative lenses provided continuously from a most magnification side.

It is preferable that the projection display device of the above-described aspect further comprises a light shielding member that shields a part of a luminous flux between a surface of the first optical system on a most reduction side and the imaging element.

In the projection display device of the above-described aspect, the light valve may emit the optical image based on the image data in a prescribed polarization state, and the first optical system may comprise a quarter wave plate and a polarizer that is arranged in a state of transmitting the light emitted from the light valve in order from the magnification side.

In the projection display device of the above-described aspect, the light valve may emit the optical image based on the image data in a prescribed polarization state, and the projection display device may comprise a polarizer that is arranged in a state of shielding the light emitted from the light valve between a surface of the first optical system on a most reduction side and the imaging element.

According to the present disclosure, a projection display device capable of performing both projection and imaging, and suppressing deterioration of imaging quality can be provided.

DESCRIPTION OF THE PREFERRED EMBODIMENTS

First Embodiment

Figure 1:
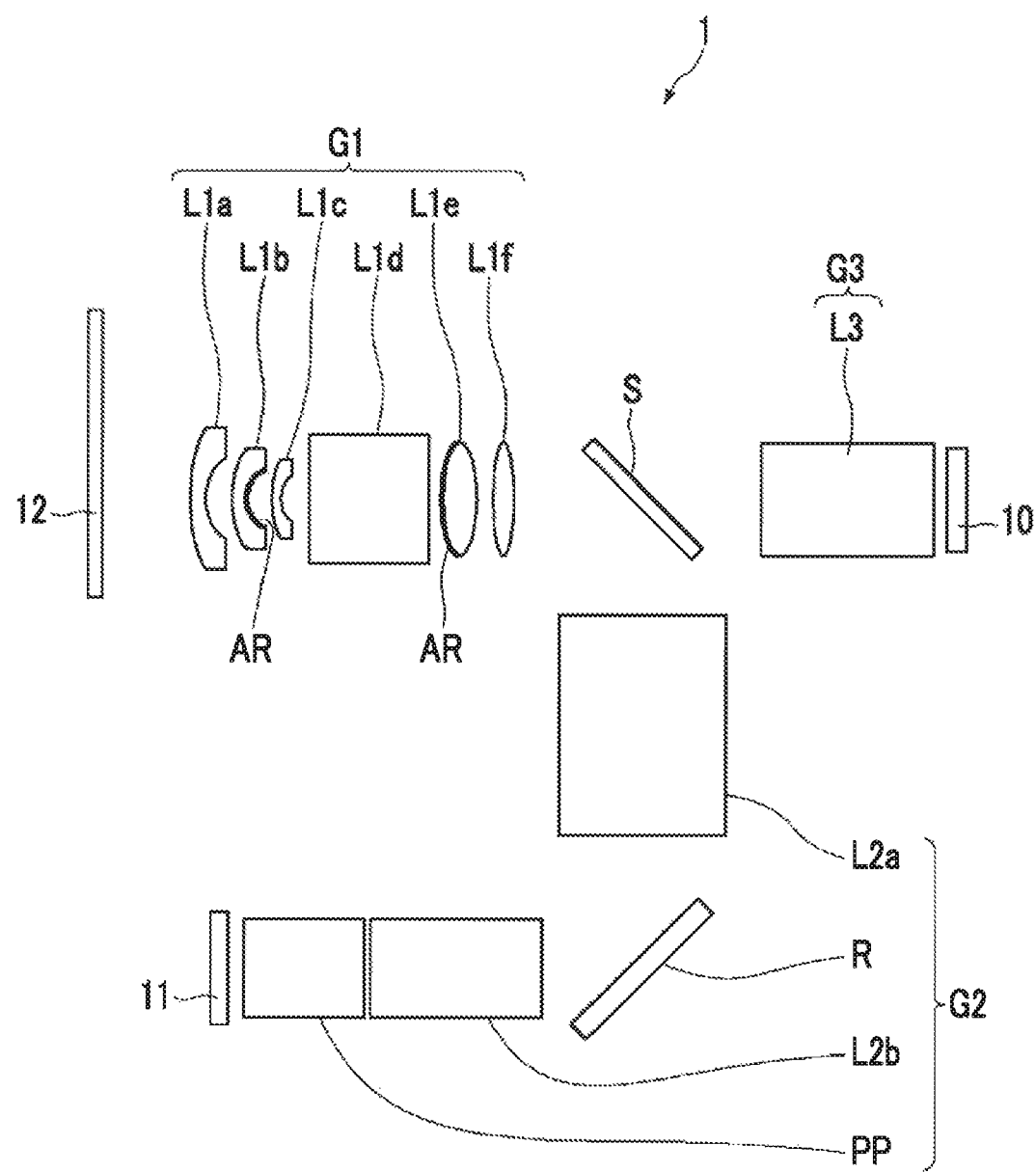
FIG. 1 is a schematic configuration diagram of a projection display device according to a first embodiment of the invention.

Hereinafter, a first embodiment of a projection display device of the invention will be described in detail referring to the drawings. FIG. 1 is a schematic configuration diagram of a projection display device according to the first embodiment of the invention. In FIG. 1, a screen 12 side becomes a magnification side in an optical path order.

As shown in FIG. 1, a projection display device 1 of the embodiment comprises an imaging element 10 that performs imaging with received light, an image projection unit 11 consisting of a light source and a light valve, and an image-forming optical system that projects an optical image of light optically modulated by the light valve onto the screen (magnification side imaging surface) 12 and forms an image of light incident from the magnification side on the imaging element.

The light valve modulates light from the light source and emits modulated light in a prescribed polarization state. As an image display element that is used for the light valve, any image display element, such as a liquid crystal display element or a liquid crystal on silicon (LCOS) display element, may be used. The light source may be appropriately composed corresponding to a system of the image display element of the light valve.

The image-forming optical system comprises a first optical system G1 that comprises at least one lens and is used in common in projection and imaging, a second optical system G2 that comprises at least one lens and is used only in projection, a third optical system G3 that comprises at least one lens and is used only in imaging, and a separation member S that separates an optical path from the second optical system G2 toward the first optical system G1 from an optical path from the first optical system G1 toward the third optical system G3.

The first optical system G1 comprises, in order from the magnification side on the optical path, a negative lens L1a, a negative lens L1b, a negative lens L1c, a lens group L1d, a positive lens L1e, and a positive lens L1f.

The second optical system G2 comprises, in order from the magnification side on the optical path, a lens group L2a, a reflection member R, a lens group L2b, and an optical member PP assumed to be a filter, a prism, or the like that is used in a color synthesis unit or an illumination light separation unit.

The third optical system G3 comprises a lens group L3.

Each lens group in the first optical system G1, the second optical system G2, and the third optical system G3 is not limited to a configuration in which the lens group consists of a plurality of lenses, and may have a configuration in which the lens group consists of only one lens.

The separation member S reflects light from the second optical system G2 toward the first optical system G1 and transmits light from the first optical system G1 toward the third optical system G3, and is composed of, for example, a transflective member, such as a half mirror.

The image-forming optical system is composed as described above, whereby it is possible to secure the number of lenses (the lenses of the first optical system G1 and the second optical system G2) to be used in projection to provide high projection performance while suppressing the number of lenses of the first optical system G1 to be used in common in projection and imaging. Similarly, it is possible to secure the number of lenses (the lenses of the first optical system G1 and the third optical system G3) to be used in imaging to provide high imaging performance.

The number of lenses (the lenses of the first optical system G1) to be used in projection among the lenses (the lenses of the first optical system G1 and the third optical system G3) to be used in imaging is reduced, and the number of reflective surfaces of projection light decreases. Therefore, reflective ghosts can be suppressed.

Figure 10:
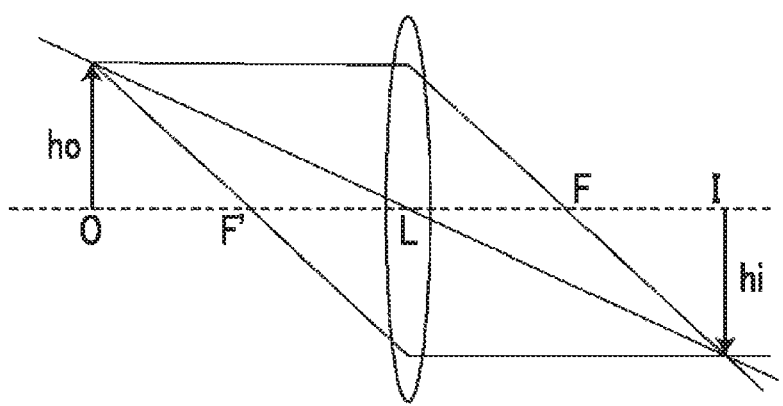
FIG. 10 is an explanatory view of definition of a magnification.

In addition, in a case where a magnification of a reflection system having a path, along which light from the light valve is reflected by one surface of the lens in the first optical system G1 and reaches the imaging element 10, is BETn, and a magnification of an entire system having a path, along which light from the light valve is reflected by the magnification side imaging surface and reaches the imaging element 10, is BET, the surfaces satisfying Conditional expression (1) among the surfaces of the lens in the first optical system G1 set as antireflection target surfaces, and an antireflection layer is comprised in at least one of the antireflection target surfaces. Conditional expression (1) is a conditional expression representing easiness of overlapping imaging light and ghost light. Here, as shown in FIG. 10, in a case where an image height of an optical system on an object side is Ho, and an image height of the optical system on an image side is Hi, the magnification is represented by Hi/Ho. In a case where an object and an image have an opposite relationship with an optical axis sandwiched therebetween, the magnification becomes negative.

$$0 \leq BETn/BET \tag{1}$$

$$0 \leq BETn/BET < 8 \tag{1-1}$$

Like the projection display device 1 of the embodiment, in a projection display device capable of performing both projection and imaging, in a case where a part (in the embodiment, the first optical system G1) of the image-forming optical system is used in common at the time of projection and at the time of imaging, there is a concern that projection light with high brightness is reflected by a lens surface of the common part and is incident on the imaging element 10 as ghost light with high brightness. In particular, in a case where ghost light has imageability, there is a problem in that ghost light based on the optical image emitted from the light valve forms an image on the imaging element 10 and is reflected in a captured image as a double image, and imaging quality is degraded.

For this reason, easiness of overlapping imaging light and ghost light is determined based on Conditional expression (1) for each lens surface of the first optical system G1 that is used in common in projection and imaging, and the surfaces satisfying Conditional expression (1) are set as the antireflection target surfaces. Since the antireflection target surfaces are reflective surfaces where imaging light and ghost light easily overlap each other, an antireflection layer is comprised in at least one of the antireflection target surfaces, whereby it is possible to effectively suppress degradation of imaging quality due to ghost light. In a case where surfaces satisfying Conditional expression (1-1) are set as antireflection target surfaces, it is possible to obtain more satisfactory characteristics. In the embodiment, as an example, a surface of the negative lens L1b on a reduction side and a surface of the positive lens L1e on the magnification side among the antireflection target surfaces comprise an antireflection layer AR.

The brightness of projection light in the projection display device 1 is generally high to be equal to or greater than 2000 lm (lumen), and the brightness of ghost light that occurs with reflection of projection light inside the device also becomes considerable brightness. Accordingly, it is preferable that the antireflection layer AR is a layer that has reflectance equal to or less than 0.18% in a wavelength range of 380 to 780 nm (nanometer) as a wavelength range of visible light. As a high-performance antireflection layer satisfying such a condition, for example, an antireflection layer having a moth-eye structure can be used. With such an aspect, it is possible to sufficiently reduce the brightness of ghost light even in projection light with high brightness. Since the high-performance antireflection layer satisfying the above-described condition is generally expensive, the antireflection layer is provided only on the antireflection target surfaces satisfying Conditional expression (1), whereby it is possible to effectively reduce the brightness of ghost light while suppressing an increase in cost.

The antireflection layer AR may be formed by forming an antireflection film on the lens surface or a fine concavo-convex structure layer like a moth-eye structure may be formed on the lens surface by applying etching treatment to the lens itself.

In the projection display device 1 of the embodiment, it is preferable that, in a case where a paraxial imaging position of the reflection system is In, a paraxial imaging position of the entire system is I, and a focal length of the entire system is f, the antireflection target surface satisfies Conditional expression (2). Conditional expression (2) is a conditional expression representing a height of imageability of ghost light on the imaging element 10, and as the value of the expression (2) is smaller, imageability of ghost light is higher. Here, the paraxial imaging position means the distance between a side of a lens closest to the imaging element 10 on the imaging element 10 side and the paraxial imaging position on the optical axis. As the surfaces satisfying Conditional expression (1) and satisfying Conditional expression (2) are set as the antireflection target surfaces, since a reflective surface where ghost light having high imageability easily overlaps can comprise the antireflection layer AR, it is possible to more effectively suppress degradation of imaging quality due to ghost light. In a case where Conditional expression (2-1) is satisfied, it is possible to obtain more satisfactory characteristics.

$$|(In-I) \times BETn/f| \times 100 < 50 \qquad (2)$$

$$0 \leq |(In-I) \times BETn/f| \times 100 < 2 \qquad (2\text{-}1)$$

It is preferable that the first optical system G1 has at least two negative lenses provided continuously from a most magnification side. With such an aspect, it is possible to suppress field curvature while setting an angle of view of the image-forming optical system to a wide angle.

Second Embodiment

Figure 2:
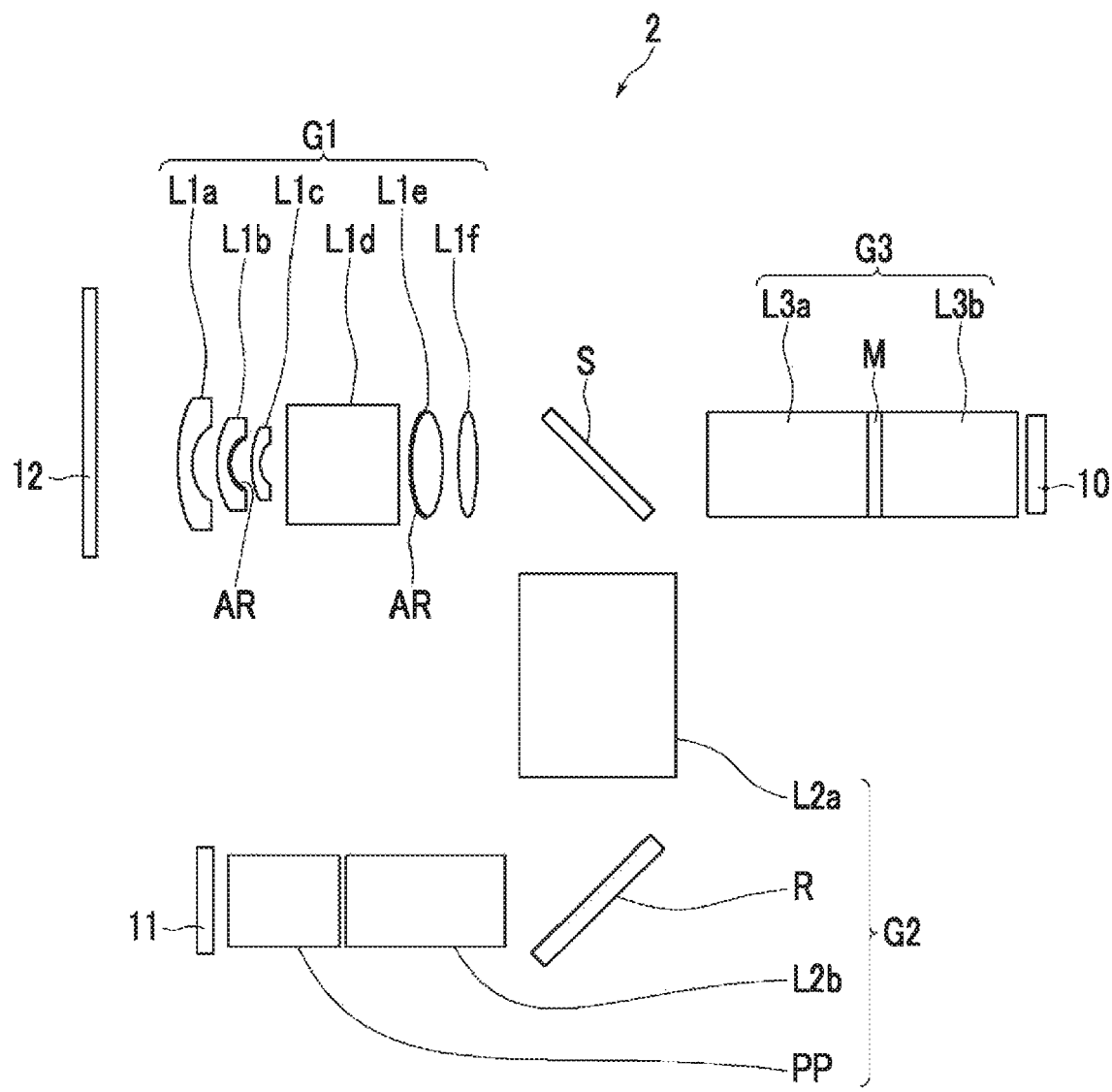
FIG. 2 is a schematic configuration diagram of a projection display device according to a second embodiment of the invention.
Figure 3:
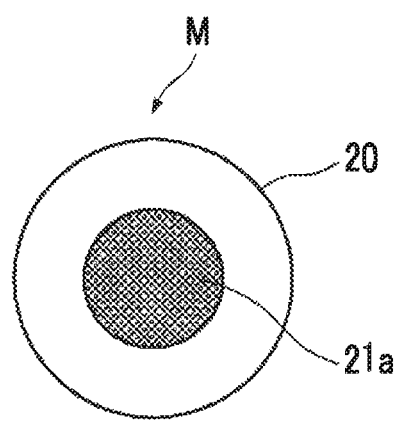
FIG. 3 is a schematic configuration diagram of a light shielding member that is arranged in a third optical system of the projection display device.

Next, a second embodiment of a projection display device of the invention will be described in detail referring to the drawings. FIG. 2 is a schematic configuration diagram of a projection display device according to a second embodiment of the invention, and FIG. 3 is a schematic configuration diagram of a light shielding member that is arranged in a third optical system of the projection display device. In FIG. 2, the screen 12 side becomes the magnification side in the optical path order. In the embodiment, elements similar to the elements in FIG. 1 are represented by the same reference numerals and description thereof will not be repeated unless needed. Here, only a difference will be primarily described.

As shown in FIG. 2, a projection display device 2 of the embodiment is different from the projection display device 1 of the first embodiment in that a mask (light shielding member) M configured to shield a part of a luminous flux is added in the third optical system G3.

The third optical system G3 comprises, in order from the magnification side on the optical path, a lens group L3a, the mask (light shielding member) M configured to shield a part of a luminous flux, and a lens group L3b. It is preferable that the mask M is arranged in the vicinity of a stop position of the third optical system G3. Here, "the vicinity of the stop position of the third optical system G3" means the inside of a space between a lens adjacent to the magnification side of the stop position on the optical path and a lens adjacent to the reduction side. Since the mask M also comprises a function as a stop, the third optical system G3 does not need to comprise a stop alone. However, the invention is not limited to such an aspect, and the third optical system G3 may comprise a mask and a stop individually.

Even in the projection display device 2 of the embodiment, it is possible to obtain the same effects as the projection display device 1 of the first embodiment. In addition, since the mask M configured to shield a part of a luminous flux is comprised in the third optical system G3, it is possible to suppress ghost without having an influence on projection.

An operation will be described specifically. Here, as an example, a case where the mask M shown in FIG. 3 is used will be described. The mask M has a circular light shielding region 21a including the optical axis formed in the center portion of an opening region 20 centering on the optical axis.

A pupil intensity distribution of the light source increases near the optical axis. Furthermore, ghost having high intensity has a characteristic to easily have imageability. Since ghost having imageability maintains a relationship close to a conjugate relation even in reflection, even though ghost is incident on the imaging element 10, light is reflected through the same optical path as at the time of projection. In this case, since the relationship of the pupil intensity distribution is also maintained even at the stop position of the third optical system G3, the center portion is shielded by the mask M arranged in the vicinity of the stop position, whereby it is possible to allow a peripheral portion to transmit imaging light while increasing a reduction effect of ghost. The shape of the light shielding region of the mask M is not limited to a circular shape, and may be made in various aspects, such as a polygonal shape.

Third Embodiment

Figure 4:
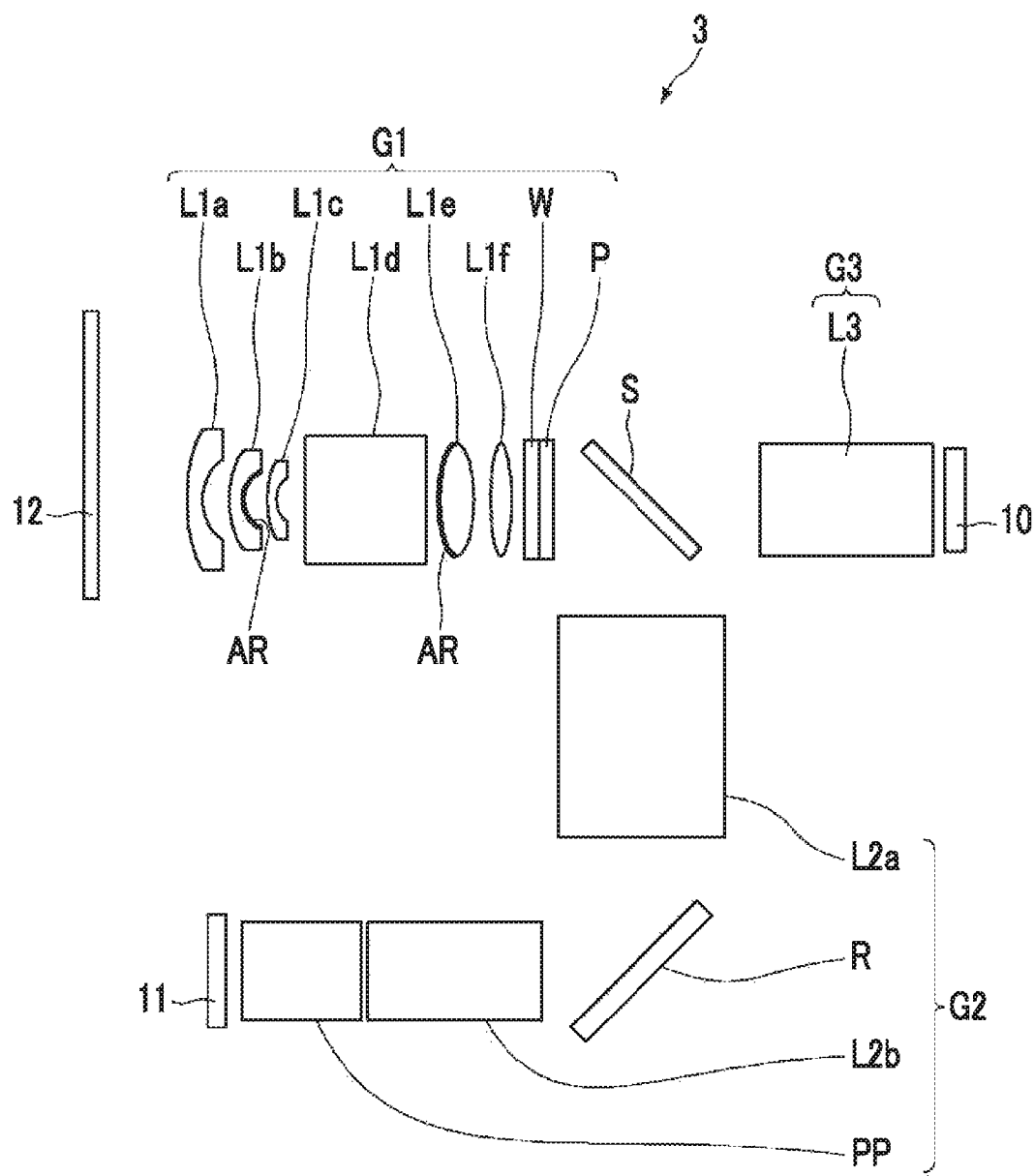
FIG. 4 is a schematic configuration diagram of a projection display device according to a third embodiment of the invention.

Next, a third embodiment of a projection display device of the invention will be described in detail referring to the drawings. FIG. 4 is a schematic configuration diagram of a projection display device according to the third embodiment of the invention. In FIG. 4, the screen 12 side becomes the magnification side in the optical path order. In the embodiment, elements similar to the elements in FIG. 1 are represented by the same reference numerals and description thereof will not be repeated unless needed. Here, only a difference will be primarily described.

A projection display device 3 of the embodiment is different from the projection display device 1 of the first embodiment in that a quarter wave plate W and a polarizer P are added in the first optical system G1.

The first optical system G1 comprises, in order from the magnification side on the optical path, a negative lens L1a, a negative lens L1b, a negative lens L1c, a lens group L1d, a positive lens L1e, a positive lens L1f, the quarter wave plate W, and the polarizer P arranged in a state of transmitting light emitted from the light valve.

Even in the projection display device 3 of the embodiment, it is possible to obtain the same effects as the projection display device 1 of the first embodiment. In addition, since the quarter wave plate W and the polarizer P are comprised in the first optical system G1, it is possible to further reduce reflected light of projection light incident from the first optical system G1 on the third optical system G3.

An operation will be described specifically. As an example, a case where linearly polarized projection light is emitted from the image projection unit 11 will be described. Projection light emitted from the light valve in a linearly polarized state (for example, a vertical direction) is transmitted through the polarizer P, and is converted to a circularly polarized state (for example, a right-handed circularly polarized state) when transmitted through the quarter wave plate W. Then, in a case where projection light in a circularly polarized state (for example, a right-handed circularly polarized state) is reflected by one surface of a lens positioned on the magnification side from the quarter wave plate W, a rotation direction of circularly polarized light is reversed.

Reflected light in the reversed circularly polarized state (for example, a left-handed circularly polarized state) is converted to a linearly polarized state (for example, a horizontal direction) when transmitted through the quarter wave plate W again; however, since the direction of linearly polarized light at this time is rotated by 90° compared to when light is emitted from the light valve, light cannot be transmitted through the polarizer P. Accordingly, it is possible to reduce reflected light of projection light incident from the first optical system G1 on the third optical system G3.

On the other hand, since light incident from the magnification side of the first optical system G1 at the time of imaging is in a non-polarization state and includes light in all vibration directions, a part of light is transmitted through the polarizer P and is incident on the third optical system G3. Accordingly, it is possible to perform imaging without any troubles.

Since it is assumed that the screen 12 has a matte surface suitable for projecting video, video projected from the image projection unit 11 onto the screen 12 has no polarization state by so-called Lambertian reflectance. For this reason, even for video projected onto the screen 12, it is possible to perform imaging without any troubles.

It is preferable that, in a case where the quarter wave plate W and the polarizer P are comprised in the first optical system G1, the quarter wave plate W and the polarizer P are arranged on a most reduction side in the first optical system G1 on the optical path. With such a configuration, it is possible to increase an effect reducing reflected light of projection light incident from the first optical system G1 on the third optical system G3.

A polarizer may be further added on the most magnification side of the third optical system G3. The polarizer that is added in the third optical system G3 is arranged so as to be in the same transmission axis direction as a transmission axis direction of the polarizer P. In such an aspect, since the two polarizers are comprised between the first optical system G1 and the imaging element 10 on the optical path, the extinction ratio of the entire polarizer portion decreases, and it is possible to further reduce reflected light of projection light incident from the first optical system G1 on the imaging element 10.

Fourth Embodiment

Figure 5:
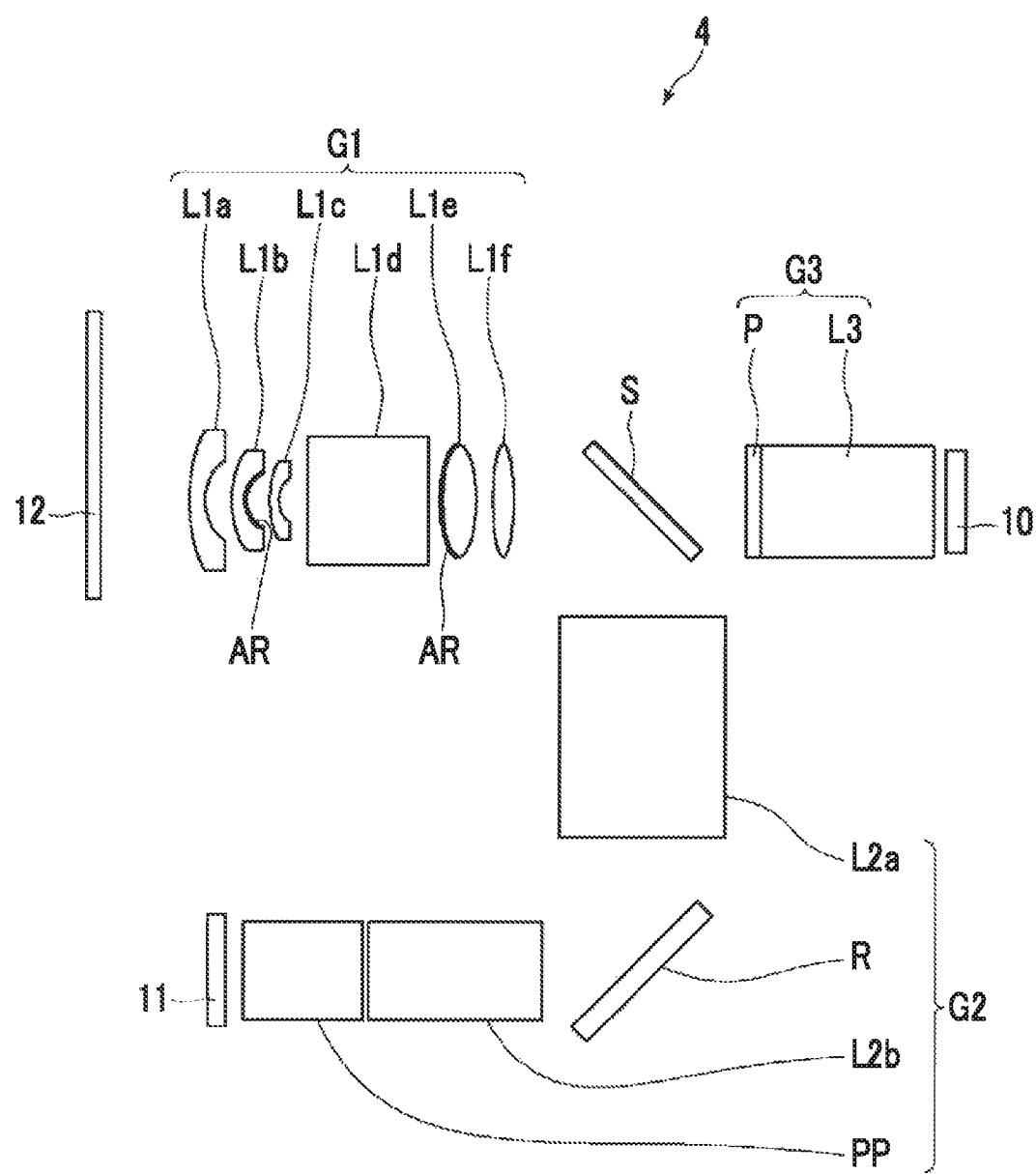
FIG. 5 is a schematic configuration diagram of a projection display device according to a fourth embodiment of the invention.

Next, a fourth embodiment of a projection display device of the invention will be described in detail referring to the drawings. FIG. 5 is a schematic configuration diagram of a projection display device according to the fourth embodiment of the invention. In FIG. 5, the screen 12 side becomes the magnification side in the optical path order. In the embodiment, elements similar to the elements in FIG. 1 are represented by the same reference numerals and description thereof will not be repeated unless needed. Here, only a difference will be primarily described.

A projection display device 3 of the embodiment is different from the projection display device 1 of the first embodiment in that a polarizer P is added in the third optical system G3.

The third optical system G3 comprises, in order from the magnification side on the optical path, the polarizer P arranged in a state of shielding light emitted from the light valve and a lens group L3.

Even in the projection display device 4 of the embodiment, it is possible to obtain the same effects as the projection display device 1 of the first embodiment. The polarizer P arranged in a state of shielding light (projection light) emitted from the light valve is comprised in the third optical system G3, whereby it is possible to reduce projection light incident from the second optical system G2 on the third optical system G3 and reflected light of projection light incident from the first optical system G1 into the third optical system G3.

An operation will be described specifically. As an example, a case where a linear polarizer is used for the polarizer P will be described. While projection light emitted from the light valve in a predetermined polarization state passes the second optical system G2 and is reflected to the first optical system G1 side by the separation member S, a part of light may leak to the third optical system G3 side.

Projection light that leaks from the second optical system G2 to the third optical system G3 side is incident on the polarizer P positioned on the most magnification side of the third optical system G3; however, since the polarizer P is arranged in a state of shielding light emitted from the light valve, light cannot be transmitted through the polarizer P. Accordingly, it is possible to reduce projection light incident from the second optical system G2 on the third optical system G3.

For reflected light of projection light incident from the first optical system G1 on the third optical system G3, in a case where light emitted from the light valve is linearly polarized light, a polarization direction is not changed compared to when light is emitted from the light valve. Furthermore, for reflected light of projection light incident from the first optical system G1 on the third optical system G3, in a case where light emitted from the light valve is circularly polarized light, a rotation direction of polarized light is reversed compared to when light is emitted from the light valve, but it is the same that polarized light is circularly polarized light. For this reason, reflected light of projection light incident from the first optical system G1 on the third optical system G3 is incident on the polarizer P by way of the reflection member R2; however, since the polarizer P is arranged in a state of shielding light emitted from the light valve, light cannot be transmitted through the polarizer P. Accordingly, it is possible to reduce reflected light of projection light incident from the first optical system G1 into the third optical system G3.

On the other hand, since light incident from the magnification side of the first optical system G1 at the time of imaging is in a non-polarization state and includes light in all vibration directions, a part of light is transmitted through the polarizer P and is incident on the third optical system G3. Accordingly, it is possible to perform imaging without any troubles.

Since it is assumed that the screen 12 has a matte surface suitable for projecting video, video projected from the image projection unit 11 onto the screen 12 has no polarization state by so-called Lambertian reflectance. For this reason, even for video projected onto the screen 12, it is possible to perform imaging without any troubles.

Fifth Embodiment

Figure 6:
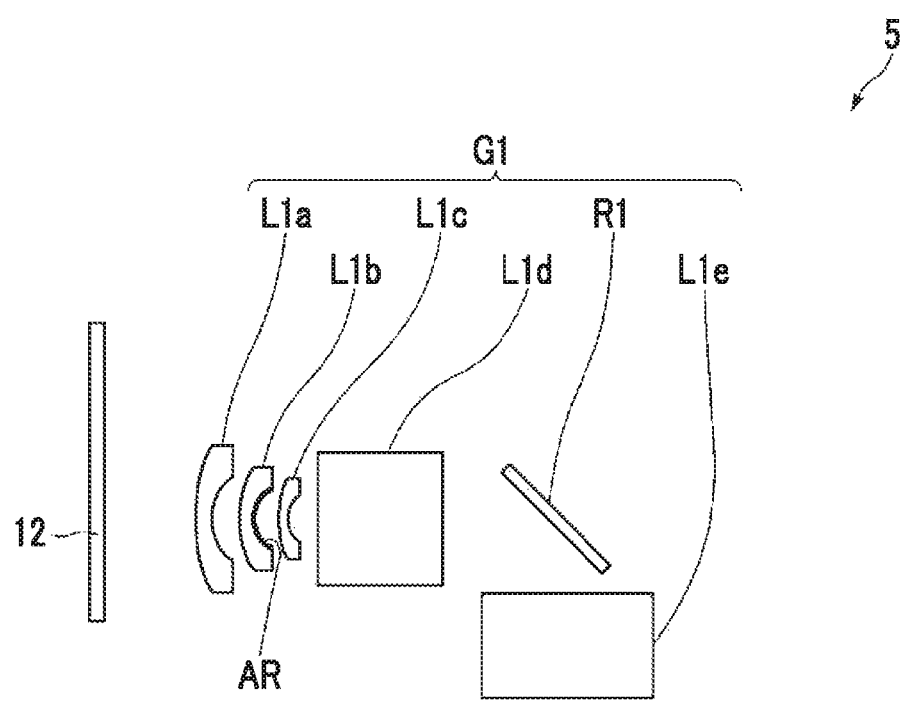
FIG. 6 is a schematic configuration diagram of a projection display device according to a fifth embodiment of the invention.
Figure 6:
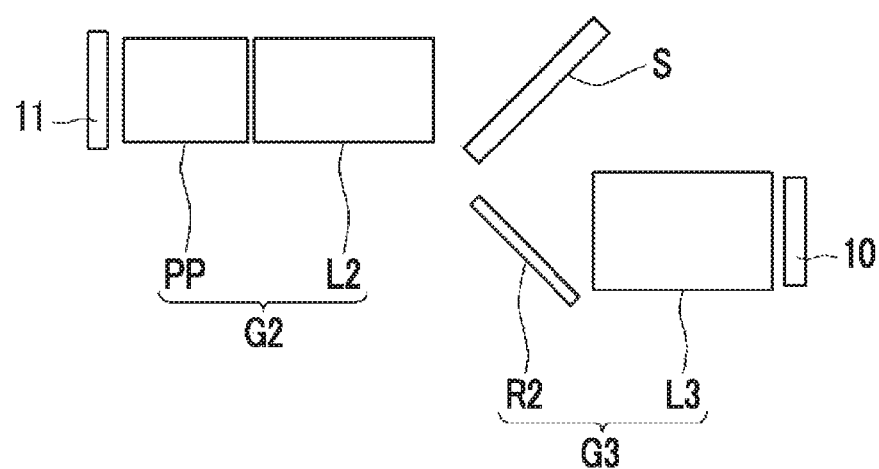

Next, a fifth embodiment of a projection display device of the invention will be described in detail referring to the drawings. FIG. 6 is a schematic configuration diagram of a projection display device according to the fifth embodiment of the invention. In FIG. 6, the screen 12 side becomes the magnification side in the optical path order. In the embodiment, elements similar to the elements in FIG. 1 are represented by the same reference numerals and description thereof will not be repeated unless needed. Here, only a difference will be primarily described.

A projection display device 5 of the embodiment is different from the projection display device 1 of the first embodiment in that the arrangement configuration of the image-forming optical system is changed by providing a reflection member R1 in the first optical system G1.

The first optical system G1 comprises, in order from the magnification side on the optical path, a negative lens L1$a$, a negative lens L1$b$, a negative lens L1$c$, a lens group L1$d$, the reflection member R1, and a lens group L1$e$.

The second optical system G2 comprises, in order from the magnification side on an optical path, a lens group L2, and an optical member PP assumed to be a filter, a prism, or the like that is used in a color synthesis unit or an illumination light separation unit.

The third optical system G3 comprises, in order from the magnification side on the optical path, a reflection member R2 and a lens group L3.

Even in the projection display device 5 of the embodiment, it is possible to obtain the same effects as the projection display device 1 of the first embodiment.

Sixth Embodiment

Figure 7:
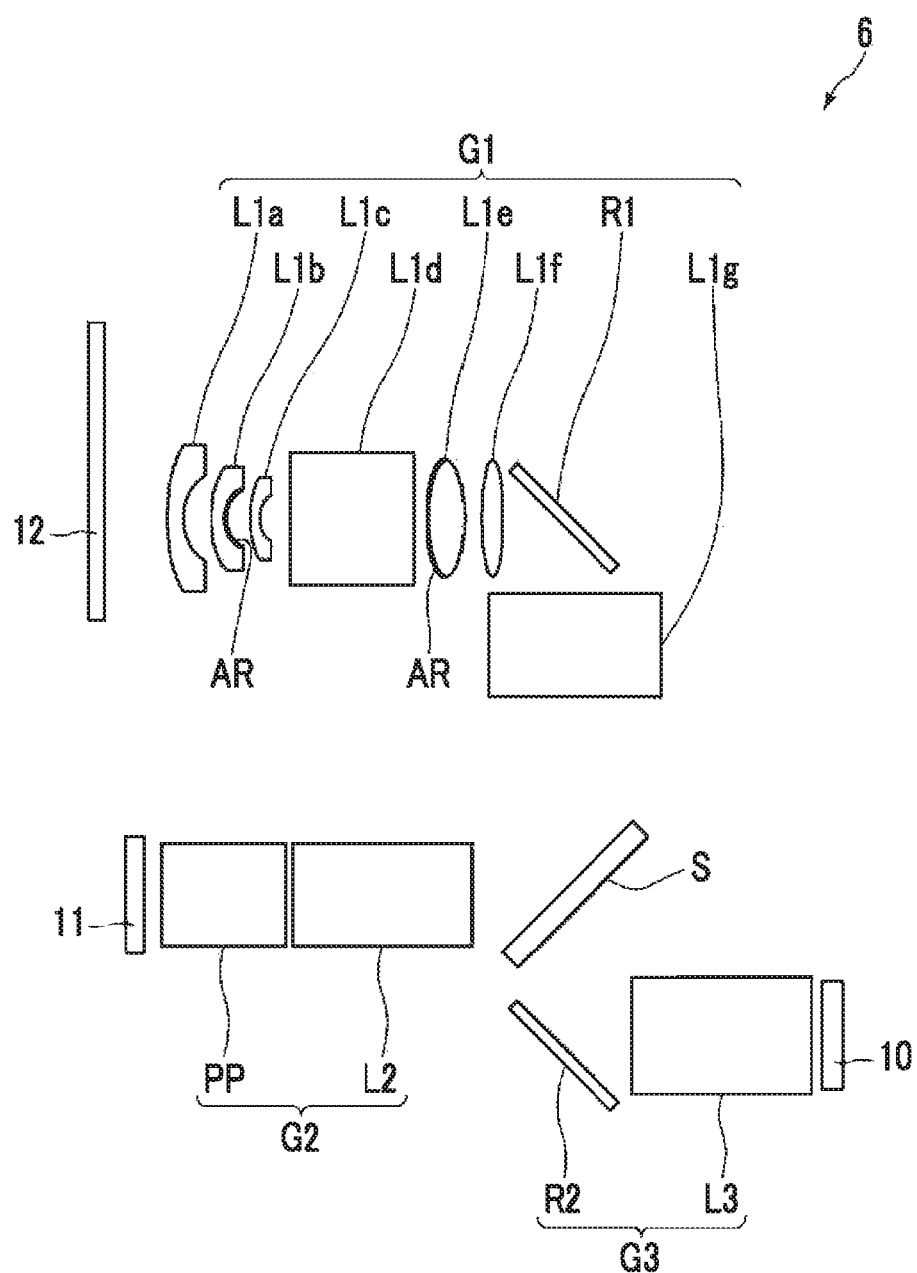
FIG. 7 is a schematic configuration diagram of a projection display device according to a sixth embodiment of the invention.

Next, a sixth embodiment of a projection display device of the invention will be described in detail referring to the drawings. FIG. 7 is a schematic configuration diagram of a projection display device according to the sixth embodiment of the invention. In FIG. 7, the screen 12 side becomes the magnification side in the optical path order. In the embodiment, elements similar to the elements in FIG. 1 are represented by the same reference numerals and description thereof will not be repeated unless needed. Here, only a difference will be primarily described.

A projection display device 6 of the embodiment is different from the projection display device 5 of the fifth embodiment in that a positive lens L1$e$ and a positive lens L1$f$ are added in the first optical system G1.

The first optical system G1 comprises, in order from the magnification side on the optical path, a negative lens L1$a$, a negative lens L1$b$, a negative lens L1$c$, a lens group L1$d$, the positive lens L1$e$, the positive lens L1$f$, a reflection member R1, and a lens group L1$g$.

Even in the projection display device 6 of the embodiment, it is possible to obtain the same effects as the projection display device 1 of the fifth embodiment.

Seventh Embodiment

Figure 8:
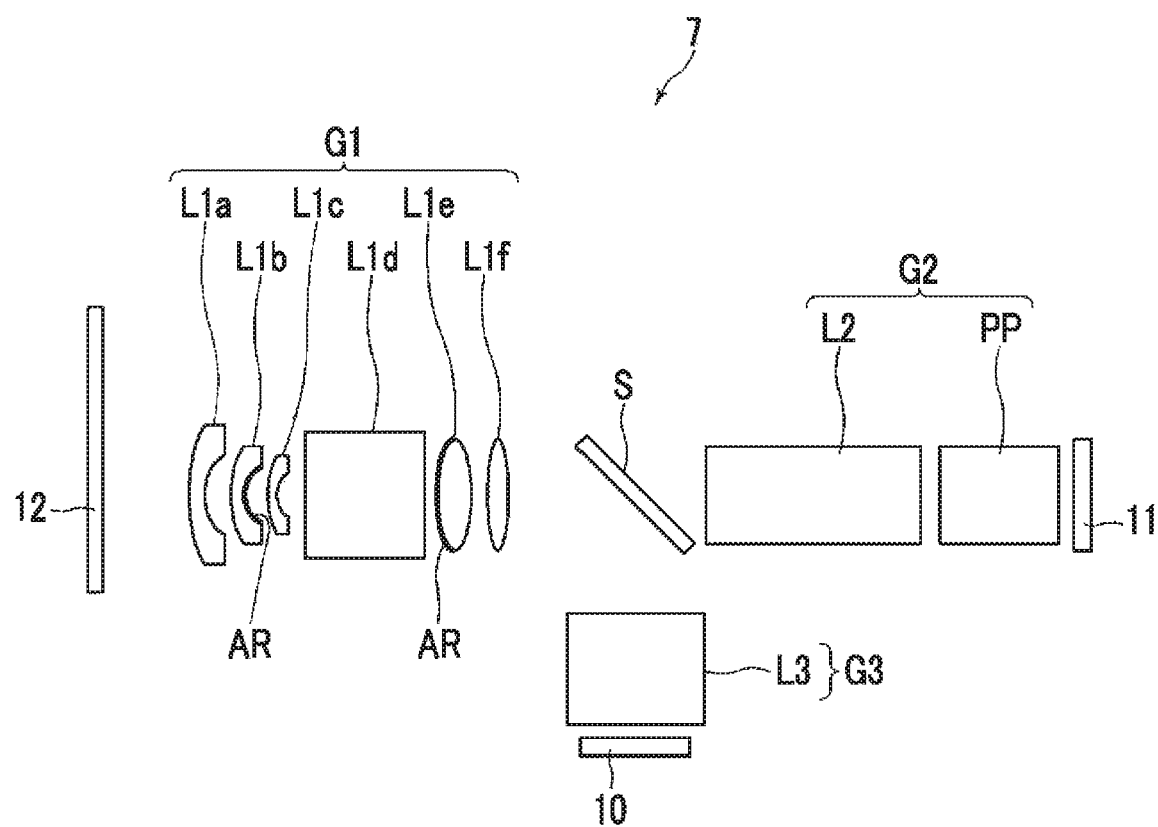
FIG. 8 is a schematic configuration diagram of a projection display device according to a seventh embodiment of the invention.

Next, a seventh embodiment of a projection display device of the invention will be described in detail referring to the drawings. FIG. 8 is a schematic configuration diagram of a projection display device according to the seventh embodiment of the invention. In FIG. 8, the screen 12 side becomes the magnification side in the optical path order. In the embodiment, elements similar to the elements in FIG. 1 are represented by the same reference numerals and description thereof will not be repeated unless needed. Here, only a difference will be primarily described.

A projection display device 7 of the embodiment is primarily different from the projection display device 1 of the first embodiment in that the second optical system G2 is arranged on a transmission side of the separation member S when viewed from the first optical system G1, and the third optical system G3 is arranged on a reflection side of the separation member S when viewed from the first optical system G1. The second optical system G2 has a simplified configuration with change in arrangement.

The second optical system G2 comprises, in order from the magnification side on an optical path, a lens group L2, and an optical member PP assumed to be a filter, a prism, or the like that is used in a color synthesis unit or an illumination light separation unit.

Even in the projection display device 7 of the embodiment, it is possible to obtain the same effects as the projection display device 1 of the first embodiment.

Example 1

Figure 9:
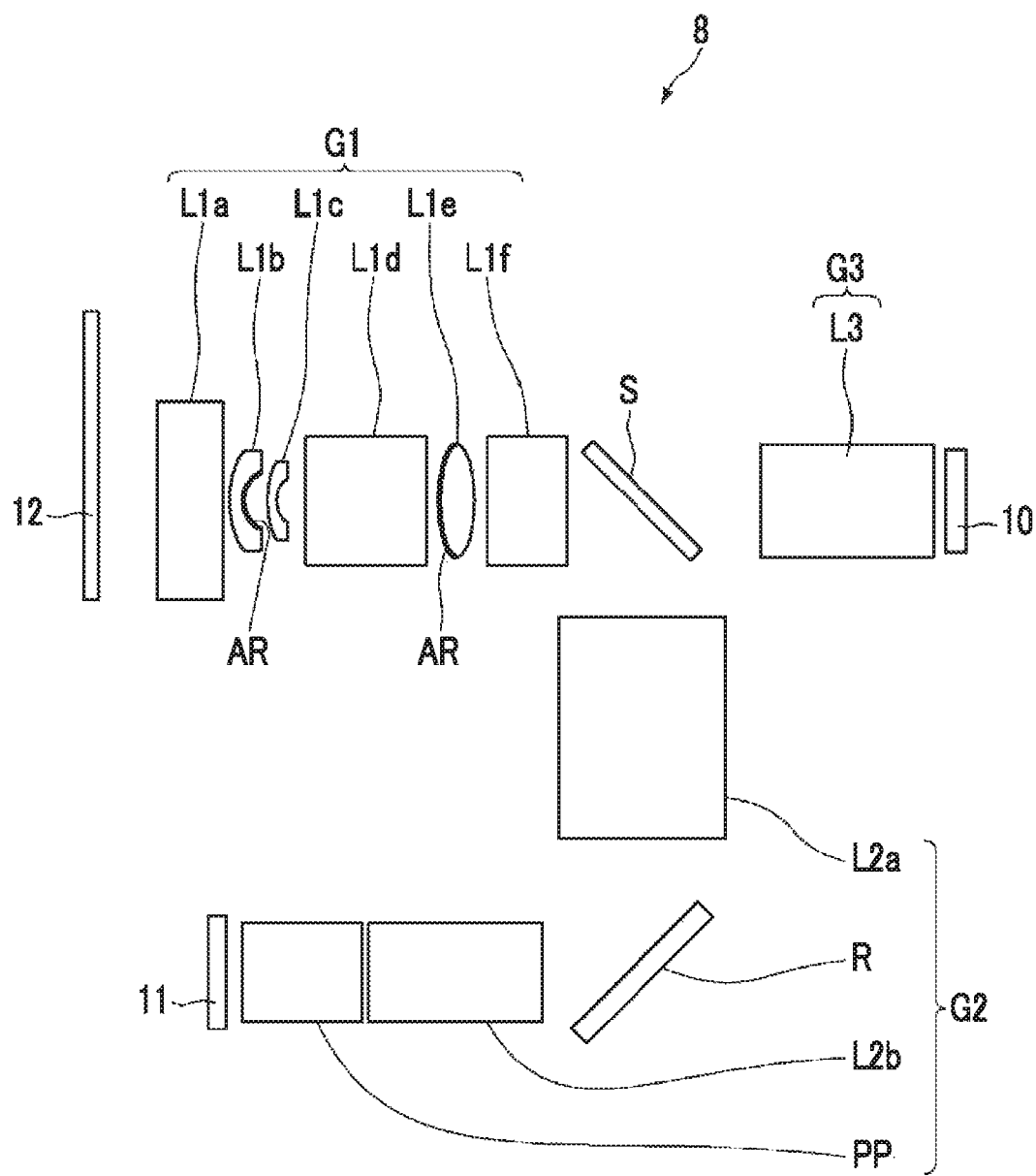
FIG. 9 is a schematic configuration diagram of a projection display device according to Example 1 of the invention.

Next, a numerical example of the image-forming optical system in the projection display device of the invention will be described. FIG. 9 is a schematic configuration diagram of a projection display device according to Example 1 of the invention. A projection display device 8 of Example 1 comprises an imaging element 10 that performs imaging with received light, an image projection unit 11 consisting of a light source and a light valve, and an image-forming optical system that projects an optical image of light optically modulated by the light valve onto the screen (magnification side imaging surface) 12 and forms an image of light incident from the magnification side on the imaging element 10.

The image-forming optical system includes a first optical system G1 that is used in common in projection and imaging, a second optical system G2 that is used only in projection, a third optical system G3 that is used only in imaging, and a separation member S that separates an optical path from the second optical system G2 toward the first optical system G1 from an optical path from the first optical system G1 toward the third optical system G3.

The first optical system is composed of, in order from the magnification side on the optical path, six lenses of a lens L1a, a lens L1b, a lens L1c, a lens L1d, a lens L1e, and a lens L1f.

The second optical system is composed of, in order from the magnification side on the optical path, 18 lenses and one optical member.

The third optical system G3 is composed of 20 lenses.

Lens data of the entire system having a path, along which light from the light valve of the image-forming optical system of Example 1 is reflected by the magnification side imaging surface and reaches the imaging element is shown in Tables 1 and 2, and data relating to the specifications of the entire system is shown in Table 3. Tables 1 and 2 show one piece of lens data in a divided manner.

In lens data of Tables 1 and 2, a column of S shows a surface number that sequentially increases in order along the optical path of the entire system with reference to a surface of the light valve, a column of R shows a radius of curvature of each surface, and a column of D shows a distance between each surface and the next surface on the optical axis. A column of Nd shows a refractive index of each optical element with respect to d line, and vd shows an Abbe number of each optical element with respect to d line. A column of remarks shows an element corresponding to each surface. A sign of the radius of curvature is positive in a case where the surface shape is convex toward the reduction side (light valve side or imaging element side), and is negative in a case where the surface shape is convex toward the magnification side (magnification side imaging surface side). In regard to a sign of the surface distance, since paraxial calculation is performed for light returned from the magnification side imaging surface to the first optical system, the sign of the surface distance after the 48th surface is negative.

In data relating to the specifications of Table 3, the values of the focal length f of the entire system, the F-Number FNo of the entire system, the magnification BET of the entire system, and the paraxial imaging position I of the entire system are shown.

In lens data and data relating to the specifications, mm (millimeter) is used as the unit of length; however, other appropriate units may be used since optical systems are usable even though the optical systems are proportionally magnified or proportionally reduced.

TABLE 1

Example 1 • Overall Lens Data (n, ν are d Line)

| S | R | D | Nd | vd | Remarks |
|---|---|---|---|---|---|
|  | 0.00000 | 0.26564 |  |  | Light Valve |
| 1 | 0.00000 | 4.57864 | 1.51633 | 64.14 | Second Optical |
| 2 | 0.00000 | 1.95319 | 1.00000 |  | System |
| 3 | 18.43605 | 0.64625 | 1.92286 | 20.88 |  |
| 4 | −9.35012 | 0.77688 | 1.00000 |  |  |
| 5 | 3.18634 | 1.51446 | 1.49700 | 81.61 |  |
| 6 | 38.82244 | 0.02312 | 1.00000 |  |  |
| 7 | 3.26747 | 0.74567 | 1.59282 | 68.62 |  |
| 8 | −8.51832 | 0.00116 | 1.56002 | 37.65 |  |
| 9 | −8.51832 | 0.11561 | 1.80518 | 25.46 |  |
| 10 | 2.04959 | 1.27746 | 1.00000 |  |  |
| 11 | 0.00000 | 1.33989 | 1.00000 |  |  |
| 12 | −2.29873 | 0.11676 | 1.59270 | 35.31 |  |
| 13 | −3.15643 | 3.23702 | 1.00000 |  |  |
| 14 | 0.00000 | 1.38729 | 1.69680 | 55.53 |  |
| 15 | −5.92761 | 0.11561 | 1.00000 |  |  |
| 16 | 8.51897 | 2.05204 | 1.63854 | 55.38 |  |
| 17 | −6.24224 | 0.00231 | 1.56002 | 37.65 |  |
| 18 | −6.24224 | 0.21965 | 1.80610 | 33.27 |  |
| 19 | 43.70954 | 4.97113 | 1.00000 |  |  |
| 20 | 0.00000 | 6.87981 | 1.00000 |  |  |
| 21 | 23.48872 | 0.89712 | 1.84666 | 23.78 |  |
| 22 | −15.47172 | 2.97574 | 1.00000 |  |  |
| 23 | 3.61335 | 0.63584 | 1.51007 | 56.24 |  |
| 24 | 4.83016 | 0.50752 | 1.00000 |  |  |
| 25 | 8.14007 | 1.67747 | 1.49700 | 81.61 |  |
| 26 | −3.30395 | 0.00116 | 1.56002 | 37.65 |  |
| 27 | −3.30395 | 0.15607 | 1.80518 | 25.46 |  |
| 28 | 3.30395 | 0.00116 | 1.56002 | 37.65 |  |
| 29 | 3.30395 | 1.58729 | 1.67790 | 55.34 |  |
| 30 | −16.79265 | 0.16994 | 1.00000 |  |  |
| 31 | 8.11511 | 1.16301 | 1.49700 | 81.61 |  |
| 32 | −8.11511 | 3.12141 | 1.00000 |  |  |
| 33 | 0.00000 | 3.08867 | 1.00000 |  | Separation Member |
| 34 | −13.42367 | 0.31445 | 1.84666 | 23.78 | First    L1f |
| 35 | −8.55013 | 0.44996 | 1.00000 |  | Optical |
| 36 | 8.86450 | 0.83469 | 1.80610 | 33.27 | System   L1e |
| 37 | −19.11469 | 3.53413 | 1.00000 |  |  |
| 38 | −5.18367 | 0.15607 | 1.72916 | 54.68 | L1d |
| 39 | 10.31944 | 1.69680 | 1.00000 |  |  |
| 40 | −2.85544 | 0.20231 | 1.91082 | 35.25 | L1c |
| 41 | −6.79132 | 0.96784 | 1.00000 |  |  |
| 42 | −3.84099 | 0.26590 | 1.83481 | 42.73 | L1b |
| 43 | −7.41222 | 1.12717 | 1.00000 |  |  |
| 44 | 9.78259 | 0.49711 | 1.53158 | 55.08 | L1a |
| 45 | 3.52979 | 0.00000 | 1.00000 |  |  |
| 46 | 0.00000 | 69.71143 | 1.00000 |  |  |
| 47 | 0.00000 | 0.00000 | 1.00000 |  | Magnification Side Imaging Surface |

TABLE 2

Example 1 • Overall Lens Data (n, ν are d Line)

| S | R | D | Nd | vd | Remarks |
|---|---|---|---|---|---|
| 47 | 0.00000 | 0.00000 | 1.00000 |  | Magnification Side |
| 48 | 0.00000 | −69.71143 | 1.00000 |  | Imaging Surface |
| 49 | 3.52979 | −0.49711 | 1.53158 | 55.08 | First    L1a |
| 50 | 9.78258 | −1.12717 | 1.00000 |  | Optical |
| 51 | −7.41222 | −0.26590 | 1.83481 | 42.73 | System   L1b |
| 52 | −3.84100 | −0.96784 | 1.00000 |  |  |
| 53 | −6.79133 | −0.20231 | 1.91082 | 35.25 | L1c |
| 54 | −2.85544 | −1.69680 | 1.00000 |  |  |
| 55 | 10.31944 | −0.15607 | 1.72916 | 54.68 | L1d |
| 56 | −5.18368 | −3.53413 | 1.00000 |  |  |
| 57 | −19.11469 | −0.83469 | 1.80610 | 33.27 | L1e |
| 58 | 8.86450 | −0.44996 | 1.00000 |  |  |
| 59 | −8.55012 | −0.31445 | 1.84666 | 23.78 | L1f |
| 60 | −13.42367 | −3.08867 | 1.00000 |  |  |
| 61 | 0.00000 | −3.12141 | 1.00000 |  | Separation Member |
| 62 | −8.11512 | −1.16301 | 1.49700 | 81.61 | Third Optical System |
| 63 | 8.11512 | −0.16994 | 1.00000 |  |  |

TABLE 2-continued

Example 1 • Overall Lens Data (n, v are d Line)

| S | R | D | Nd | vd | Remarks |
|---|---|---|---|---|---|
| 64 | −16.79265 | −1.58729 | 1.67790 | 55.34 | |
| 65 | 3.30395 | −0.00116 | 1.56002 | 37.65 | |
| 66 | 3.30395 | −0.15607 | 1.80518 | 25.46 | |
| 67 | −3.30395 | −0.00116 | 1.56002 | 37.65 | |
| 68 | −3.30395 | −1.67747 | 1.49700 | 81.61 | |
| 69 | 8.14008 | −0.50752 | 1.00000 | | |
| 70 | 4.83016 | −0.63584 | 1.51007 | 56.24 | |
| 71 | 3.61335 | −2.97574 | 1.00000 | | |
| 72 | −15.47172 | −0.89712 | 1.84666 | 23.78 | |
| 73 | 23.48872 | −12.73650 | 1.00000 | | |
| 77 | 0.00000 | −7.58964 | 1.00000 | | |
| 78 | −29.83935 | −0.81041 | 1.49700 | 81.61 | |
| 79 | 13.72357 | −0.03584 | 1.00000 | | |
| 80 | −8.58415 | −0.80925 | 1.49700 | 81.61 | |
| 81 | 99.09564 | −0.04624 | 1.00000 | | |
| 82 | −4.23574 | −0.86706 | 1.67790 | 55.34 | |
| 83 | −12.44224 | −0.04624 | 1.00000 | | |
| 84 | −2.85565 | −1.05897 | 1.49700 | 81.61 | |
| 85 | 42.48582 | −0.00116 | 1.56002 | 37.65 | |
| 86 | 42.48582 | −0.50405 | 1.64769 | 33.79 | |
| 87 | −1.41846 | −0.82551 | 1.00000 | | |
| 88 | 17.98637 | −0.24509 | 1.72825 | 28.46 | |
| 89 | −1.37758 | −0.00116 | 1.56002 | 37.65 | |
| 90 | −1.37758 | −0.82081 | 1.83481 | 42.74 | |
| 91 | −16.43835 | −0.23122 | 1.00000 | | |
| 92 | 0.00000 | −1.16764 | 1.00000 | | |
| 93 | −3.62022 | −0.12139 | 1.80400 | 46.53 | |
| 94 | −1.36556 | −0.00116 | 1.56002 | 37.65 | |
| 95 | −1.36556 | −0.64856 | 1.80518 | 25.46 | |
| 96 | 6.93918 | −1.41945 | 1.00000 | | |
| | 0.00000 | 0.00000 | 1.00000 | | Imaging Element |

TABLE 3

| f | 16.84432 |
|---|---|
| Fno | 1.20 |
| BET | 0.56 |
| I | −1.42 |

Next, lens data of the reflection system having the path, along which light from the light valve of the image-forming optical system of Example 1 is reflected by one surface of the lens in the first optical system and reaches the imaging element is shown in Tables 4 and 5. Tables 4 and 5 show one piece of lens data in a divided manner. Here, as an example, lens data in a case where light is reflected by a surface (42nd surface) of the lens L1b of the first optical system on the reduction side is shown.

TABLE 4

Example 1 • Reflection System Lens Data (n, v are d Line)

| S | R | D | Nd | vd | Remarks |
|---|---|---|---|---|---|
| | 0.00000 | 0.26564 | | | Light Valve |
| 1 | 0.00000 | 4.57864 | 1.51633 | 64.14 | Second Optical System |
| 2 | 0.00000 | 1.95319 | 1.00000 | | |
| 3 | 18.43605 | 0.64625 | 1.92286 | 20.88 | |
| 4 | −9.35012 | 0.77688 | 1.00000 | | |
| 5 | 3.18634 | 1.51446 | 1.49700 | 81.61 | |
| 6 | 38.82244 | 0.02312 | 1.00000 | | |
| 7 | 3.26747 | 0.74567 | 1.59282 | 68.62 | |
| 8 | −8.51832 | 0.00116 | 1.56002 | 37.65 | |
| 9 | −8.51832 | 0.11561 | 1.80518 | 25.46 | |
| 10 | 2.04959 | 1.27746 | 1.00000 | | |
| 11 | 0.00000 | 1.33989 | 1.00000 | | |
| 12 | −2.29873 | 0.11676 | 1.59270 | 35.31 | |
| 13 | −3.15643 | 3.23702 | 1.00000 | | |
| 14 | 0.00000 | 1.38729 | 1.69680 | 55.53 | |

TABLE 4-continued

Example 1 • Reflection System Lens Data (n, v are d Line)

| S | R | D | Nd | vd | Remarks |
|---|---|---|---|---|---|
| 15 | −5.92761 | 0.11561 | 1.00000 | | |
| 16 | 8.51897 | 2.05204 | 1.63854 | 55.38 | |
| 17 | −6.24224 | 0.00231 | 1.56002 | 37.65 | |
| 18 | −6.24224 | 0.21965 | 1.80610 | 33.27 | |
| 19 | 43.70954 | 4.97113 | 1.00000 | | |
| 20 | 0.00000 | 6.87981 | 1.00000 | | |
| 21 | 23.48872 | 0.89712 | 1.84666 | 23.78 | |
| 22 | 15.47172 | 2.97574 | 1.00000 | | |
| 23 | 3.61335 | 0.63584 | 1.51007 | 56.24 | |
| 24 | 4.83016 | 0.50752 | 1.00000 | | |
| 25 | 8.14007 | 1.67747 | 1.49700 | 81.61 | |
| 26 | −3.30395 | 0.00116 | 1.56002 | 37.65 | |
| 27 | −3.30395 | 0.15607 | 1.80518 | 25.46 | |
| 28 | 3.30395 | 0.00116 | 1.56002 | 37.65 | |
| 29 | 3.30395 | 1.58729 | 1.67790 | 55.34 | |
| 30 | 16.79265 | 0.16994 | 1.00000 | | |
| 31 | 8.11511 | 1.16301 | 1.49700 | 81.61 | |
| 32 | −8.11511 | 3.12141 | 1.00000 | | |
| 33 | 0.00000 | 3.08867 | 1.00000 | | Separation Member |
| 34 | 13.42367 | 0.31445 | 1.84666 | 23.78 | First Optical System L1f |
| 35 | −8.55013 | 0.44996 | 1.00000 | | |
| 36 | 8.86450 | 0.83469 | 1.80610 | 33.27 | L1e |
| 37 | 19.11469 | 3.53413 | 1.00000 | | |
| 38 | −5.18367 | 0.15607 | 1.72916 | 54.68 | L1d |
| 39 | 10.31944 | 1.69680 | 1.00000 | | |
| 40 | −2.85544 | 0.20231 | 1.91082 | 35.25 | L1c |
| 41 | −6.79132 | 0.96784 | 1.00000 | | |
| (Reflective Surface) 42 | −3.84099 | 0.00000 | 1.00000 | | L1b |
| 43 | 0.00000 | 0.00000 | 1.00000 | | |
| 44 | 0.00000 | 0.00000 | 1.00000 | | L1a |
| 45 | 0.00000 | 0.00000 | 1.00000 | | |
| 46 | 0.00000 | 0.00000 | 1.00000 | | |
| 47 | 0.00000 | 0.00000 | 1.00000 | | Magnification Side Imaging Surface |

TABLE 5

Example 1 • Reflection System Lens Data (n, v are d Line)

| S | R | D | Nd | vd | Remarks |
|---|---|---|---|---|---|
| 47 | 0.00000 | 0.00000 | 1.00000 | | Magnification Side Imaging Surface |
| 48 | 0.00000 | 0.00000 | 1.00000 | | |
| 49 | 0.00000 | 0.00000 | 1.00000 | | First Optical System L1a |
| 50 | 0.00000 | 0.00000 | 1.00000 | | |
| 51 | 0.00000 | 0.00000 | 1.00000 | | L1b |
| 52 | 0.00000 | −0.96784 | 1.00000 | | |
| 53 | −6.79133 | −0.20231 | 1.91082 | 35.25 | L1c |
| 54 | −2.85544 | −1.69680 | 1.00000 | | |
| 55 | 10.31944 | −0.15607 | 1.72916 | 54.68 | L1d |
| 56 | −5.18368 | −3.53413 | 1.00000 | | |
| 57 | −19.11469 | −0.83469 | 1.80610 | 33.27 | L1e |
| 58 | 8.86450 | −0.44996 | 1.00000 | | |
| 59 | −8.55012 | −0.31445 | 1.84666 | 23.78 | L1f |
| 60 | −13.42367 | −3.08867 | 1.00000 | | |
| 61 | 0.00000 | −3.12141 | 1.00000 | | Separation Member |
| 62 | −8.11512 | −1.16301 | 1.49700 | 81.61 | Third Optical System |
| 63 | 8.11512 | −0.16994 | 1.00000 | | |
| 64 | −16.79265 | −1.58729 | 1.67790 | 55.34 | |
| 65 | 3.30395 | −0.00116 | 1.56002 | 37.65 | |
| 66 | 3.30395 | −0.15607 | 1.80518 | 25.46 | |
| 67 | −3.30395 | −0.00116 | 1.56002 | 37.65 | |
| 68 | −3.30395 | −1.67747 | 1.49700 | 81.61 | |
| 69 | 8.14008 | −0.50752 | 1.00000 | | |
| 70 | 4.83016 | −0.63584 | 1.51007 | 56.24 | |
| 71 | 3.61335 | −2.97574 | 1.00000 | | |
| 72 | −15.47172 | −0.89712 | 1.84666 | 23.78 | |
| 73 | 23.48872 | −12.73650 | 1.00000 | | |
| 77 | 0.00000 | −7.58964 | 1.00000 | | |
| 78 | −29.83935 | −0.81041 | 1.49700 | 81.61 | |

TABLE 5-continued

Example 1 • Reflection System Lens Data (n, v are d Line)

| S | R | D | Nd | vd | Remarks |
|---|---|---|---|---|---|
| 79 | 13.72357 | −0.03584 | 1.00000 | | |
| 80 | −8.58415 | −0.80925 | 1.49700 | 81.61 | |
| 81 | 99.09564 | −0.04624 | 1.00000 | | |
| 82 | −4.23574 | −0.86706 | 1.67790 | 55.34 | |
| 83 | −12.44224 | −0.04624 | 1.00000 | | |
| 84 | −2.85565 | −1.05897 | 1.49700 | 81.61 | |
| 85 | 42.48582 | −0.00116 | 1.56002 | 37.65 | |
| 86 | 42.48582 | −0.50405 | 1.64769 | 33.79 | |
| 87 | −1.41846 | −0.82551 | 1.00000 | | |
| 88 | 17.98637 | −0.24509 | 1.72825 | 28.46 | |
| 89 | −1.37758 | −0.00116 | 1.56002 | 37.65 | |
| 90 | −1.37758 | −0.82081 | 1.83481 | 42.74 | |
| 91 | −16.43835 | −0.23122 | 1.00000 | | |
| 92 | 0.00000 | −1.16764 | 1.00000 | | |
| 93 | −3.62022 | −0.12139 | 1.80400 | 46.53 | |
| 94 | −1.36556 | −0.00116 | 1.56002 | 37.65 | |
| 95 | −1.36556 | −0.64856 | 1.80518 | 25.46 | |
| 96 | 6.93918 | −1.41945 | 1.00000 | | |
| | 0.00000 | 0.00000 | 1.00000 | | Imaging Element |

Next, data relating to the specifications of the reflection system of the image-forming optical system of Example 1 is shown in Table 6. In data relating to the specifications of Table 6, the values of the magnification BETn of the reflection system, the paraxial imaging position In of the reflection system, BETn/BET, In−I, and |(In−I)×BETn/f|× 100 are shown. In Table 6, F in each lens indicates a magnification-side surface, and R indicates a reduction-side surface.

TABLE 6

| | L1a | | L1b | | L1c | |
|---|---|---|---|---|---|---|
| | F | R | F | R | F | R |
| BETn | −0.18 | −0.53 | 1.77 | 0.56 | 1.18 | 0.35 |
| In | −1.45 | −1.42 | −1.75 | −1.59 | −1.83 | −1.64 |
| BETn/BET | −0.32 | −0.94 | 3.18 | 1.00 | 2.12 | 0.62 |
| In − I | −0.03 | 0.00 | −0.33 | −0.17 | −0.41 | −0.23 |
| |(In − I)*BETn/f|*100 | 0.03 | 0.01 | 3.43 | 0.55 | 2.88 | 0.47 |

| | L1d | | L1e | | L1f | |
|---|---|---|---|---|---|---|
| | F | R | F | R | F | R |
| BETn | −0.85 | 0.38 | 0.68 | −0.34 | 1.79 | −0.95 |
| In | −1.25 | −2.02 | −3.93 | −1.91 | −7.55 | −0.34 |
| BETn/BET | −1.52 | 0.68 | 1.22 | −0.62 | 3.21 | −1.70 |
| In − I | 0.17 | −0.60 | −2.51 | −0.49 | −6.13 | 1.08 |
| |(In − I)*BETn/f|*100 | 0.85 | 1.35 | 10.12 | 1.00 | 65.12 | 6.10 |

In the image-forming optical system of Example 1, a magnification-side surface and a reduction-side surface of the lens L1b, a magnification-side surface and a reduction-side surface of the lens L1c, a reduction-side surface of the lens L1d, a magnification-side surface of the lens L1e, and a magnification-side surface of the lens L1f satisfy Conditional expression (1).

$$0 < BETn/BET \quad (1)$$

All surfaces of the lens L1f excluding the magnification-side surface satisfy Conditional expression (2).

$$(In-I) \times BETn/f| \times 100 < 50 \quad (2)$$

Accordingly, in the image-forming optical system of Example 1, as described above, the surfaces satisfying Conditional expression (1) are set as the antireflection target surfaces, and the antireflection layer is comprised in at least one of the antireflection target surfaces, whereby it is possible to effectively suppress degradation of imaging quality due to ghost light.

As the antireflection target surfaces, as described above, the surfaces satisfying both Conditional expression (1) and Conditional expression (2) are set as the antireflection target surfaces, and the antireflection layer is comprised in at least one of the antireflection target surfaces, whereby it is possible to more effectively suppress degradation of imaging quality due to ghost light.

Although the technique of the present disclosure has been described through the embodiment and the example above, the technique of the present disclosure is not limited to the above-described embodiment and example, and various modifications may be made.

For example, in the image-forming optical system, in a case where an optical system consisting of the first optical system and the second optical system to be used in projection is a relay optical system that forms an intermediate image, the separation member may be arranged at the position of the intermediate image on the optical path or the position adjacent to the intermediate image on the optical path. Since a space is easily secured near the intermediate image, with such a configuration, the separation member is easily arranged.

As described above, in a case where the separation member is arranged near the intermediate image, an optical system to be closer to the magnification side than the intermediate image becomes the first optical system. In a case where a relay optical system is made to have high performance, since many lenses are needed to be closer to the magnification side than the intermediate image, the number of lenses of the first optical system G1 to be used in common in projection and imaging increases. As a result, since it is possible to suppress the number of lenses of the second optical system to be used only in projection and the third optical system to be used only in imaging, it is possible to achieve reduction in size of the entire image-forming optical system.

A configuration may be made that the image-forming optical system is not provided with a second optical system that comprises at least one lens and is used only in projection and/or a third optical system that comprises at least one lens and is used only in imaging.

The radius of curvature, the surface distance, the refractive index, the Abbe number, and the like of each lens composing the image-forming optical system are not limited to the values shown in the numerical example, and may take other values.

The light valve is not limited to an aspect in which light from the light source is spatially modulated by the image display element and is output as the optical image based on image data, and an aspect in which light itself output from a self-luminous image display element is output as an optical image based on image data. As the self-luminous image display element, for example, an image display element, in which light emitting elements, such as light emitting diodes (LED) or organic light emitting diodes (OLED), are arranged in a two-dimensional manner is exemplified.

In addition to those described above, various improvements or modifications may be of course made without departing from the spirit and scope of the invention.

EXPLANATION OF REFERENCES 1 to 8: projection display device
10: imaging element
11: image projection unit
12: screen
G1: first optical system
G2: second optical system
G3: third optical system
L1a to L3b: lens/lens group
M: mask
P: polarizer
PP: optical member
R, R1, R2: reflection member
S: separation member
W: quarter wave plate

What is claimed is:

1. A projection display device comprising:
an imaging element that performs imaging with received light;
a light valve that emits an optical image based on image data; and
an image-forming optical system that projects an optical image according to light emitted from the light valve onto a magnification side imaging surface and forms an image of light incident from a magnification side on the imaging element,
wherein the image-forming optical system comprises a first optical system that comprises at least one lens and is used in common in projection and imaging, and a separation member that separates an optical path from the light valve toward the first optical system from an optical path from the first optical system toward the imaging element, and
in a case where a magnification of a reflection system having a path, along which light from the light valve is reflected by one surface of the lens in the first optical system and reaches the imaging element, is BETn, and a magnification of an entire system having a path, along which light from the light valve is reflected by the magnification side imaging surface and reaches the imaging element, is BET, surfaces satisfying Conditional expression (1) among the surfaces of the lens in the first optical system are set as antireflection target surfaces, and at least one of the antireflection target surfaces comprises an antireflection layer, $$0 \leq BETn/BET \qquad (1),$$

2. The projection display device according to claim 1, wherein the antireflection layer is a layer that has reflectance equal to or less than 0.18% in a wavelength range of 380 to 780 nm.

3. The projection display device according to claim 1, wherein, in a case where a paraxial imaging position of the reflection system is In, a paraxial imaging position of the entire system is I, and a focal length of the entire system is f, the antireflection target surfaces satisfy Conditional expression (2), $$|(In-I) \times BETn/f| \times 100 < 50 \qquad (2).$$

4. The projection display device according to claim 1, wherein the first optical system has at least two negative lenses provided continuously from a most magnification side.

5. The projection display device according to claim 1, further comprising:
a light shielding member that shields a part of a luminous flux between a surface of the first optical system on a most reduction side and the imaging element.

6. The projection display device according to claim 1, wherein the light valve emits the optical image based on the image data in a prescribed polarization state, and the first optical system comprises a quarter wave plate and a polarizer that is arranged in a state of transmitting the light emitted from the light valve in order from the magnification side.

7. The projection display device according to claim 1, wherein the light valve emits the optical image based on the image data in a prescribed polarization state, and the projection display device comprises a polarizer that is arranged in a state of shielding the light emitted from the light valve between a surface of the first optical system on a most reduction side and the imaging element.

8. The projection display device according to claim 1, wherein Conditional expression (1-1) is satisfied, $$0 \leq BETn/BET < 8 \qquad (1-1).$$

9. The projection display device according to claim 3, wherein Conditional expression (2-1) is satisfied, $$0 \leq |(In-I) \times BETn/f| \times 100 < 2 \qquad (2-1).$$

* * * * *